Figure 1:
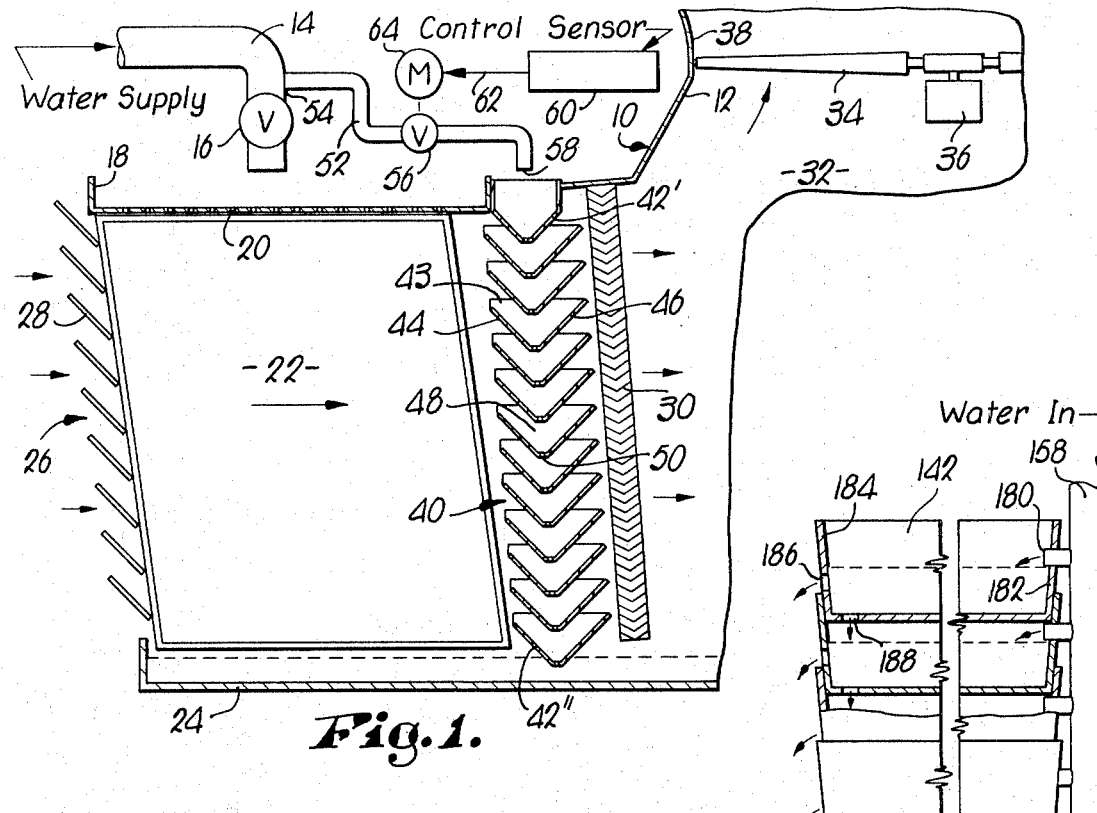

United States Patent [19]
Cates et al.

[11] 3,802,675
[45] Apr. 9, 1974

[54] HYDRAULIC DAMPER FOR THROTTLING AIR FLOW THROUGH AIR PASSAGE

[75] Inventors: Robert E. Cates, Leawood, Kans.; Robert M. Mitchell, Kansas City, Mo.

[73] Assignee: The Marley Company, Mission, Kans.

[22] Filed: June 19, 1972

[21] Appl. No.: 264,149

[52] U.S. Cl............................. 261/111, 261/DIG. 11
[51] Int. Cl................................................ B01f 3/04
[58] Field of Search............ 761/DIG. 11, 108–111, 761/113

[56] References Cited
UNITED STATES PATENTS

| | | | |
|---|---|---|---|
| 1,383,039 | 6/1921 | Unde | 261/DIG. 11 |
| 1,567,415 | 12/1925 | Burhorn | 261/DIG. 11 |
| 829,700 | 8/1906 | Drees | 261/111 |
| 1,977,074 | 10/1934 | Madsen | 261/111 |
| 3,322,409 | 5/1967 | Reed | 261/DIG. 11 |
| 1,591,893 | 7/1926 | Tappen | 137/253 |

FOREIGN PATENTS OR APPLICATIONS

| | | | |
|---|---|---|---|
| 15,931 | 8/1916 | Great Britain | 261/DIG. 11 |

Primary Examiner—Tim R. Miles
Assistant Examiner—Steven H. Markowitz
Attorney, Agent, or Firm—Schmidt, Johnson, Hovey & Williams

[57] ABSTRACT

Damper apparatus for the controlled reduction or blocking of flow of a gaseous medium such as air along a normal flow path in equipment such as water cooling towers is characterized by the elimination of moving shutters or similar mechanical parts through the use of a liquid medium such as water in conjunction with fixed liquid supporting structures for partially or entirely restricting the normal flow path of the gas. The apparatus employs a plurality of trough-like structures disposed one above the other in the path of normal flow of air or other gas to sub-divide such path into a number of sub-paths between the structures, and the structures are so juxtaposed that the effective cross-sectional area of the sub-paths may be either reduced in selected amount or completely blocked by the level of water or other liquid supplied to and supported in the structures. Water may be supplied at a controlled rate either to all of the trough structures simultaneously at the ends thereof, or to the uppermost structure for flow from each structure to a lower structure. In this manner, the level of water in all of the structures can be controlled merely by controlling the rate of supply of water to the structures.

11 Claims, 4 Drawing Figures

PATENTED APR 9 1974 3,802,675

HYDRAULIC DAMPER FOR THROTTLING AIR FLOW THROUGH AIR PASSAGE

This invention relates to the control of flow of a gaseous medium and, more particularly, to what may be called a liquid damper that is especially adapted for use in selectively reducing or blocking the normal air flow in a water cooling tower by means requiring only stationary structures, a supply of water, a water control valve, and, if desired, suitable automatic sensing means for controlling the valve.

Although the invention is perceived to likely also have utility in other analogous fields, the known primary area of need for immediate application of the invention is in water cooling towers, so the invention will initially be illustrated and explained in that context.

Water cooling towers are made in a variety of types to accommodate particular applications and preferences. One broad class of cooling tower commonly known as of the cross-flow type utilizes the interaction of air currents flowing along a generally horizontal path upon water to be cooled that is gravitating downwardly through such path from above. In cross-flow towers of what is called the wet type, fill is employed to break up the falling water into droplets for better and more prolonged contact with the moving air currents, while cross-flow towers of the so-called dry type interpose indirect contact heat exchange elements made of finned tubing or the like to enclose the path of the falling water, separating the water from the normal air flow. Moreover, cross-flow towers include those of so-called induced draft type in which a driven fan assembly produces the desired movement of air, the hyperbolic type in which the desired air flow is induced by a chimney effect, and even other so-called natural draft type towers in which ambient winds and air currents are relied upon to produce the desired air flow. Such cross-flow towers typically employ a fill or indirect cooling components through which air is drawn from the atmosphere at the side of the tower and most often discharged upwardly above the tower.

Some cross-flow towers, sometimes referred to as of the parallel path variety, employ both wet and dry cooling components with the dry cooling components disposed adjacent to and above or below the wet cooling components. In another class of cooling tower commonly known as the counter-flow type the movement of air within the cooling zone is upward and directly counter to the fall of the gravitating water to be cooled, but even these towers normally are provided with an air inlet at the side of the tower and near the bottom thereof through which air enters the tower in a generally horizontal direction. Thus, with all of these towers, there is a zone within the normal path of travel of the air into, through and out of the tower through which the normal flow of air will pass in a generally horizontal direction.

For a variety of reasons, it is often desirable to either reduce or even to completely block the normal flow of air through one or more cooling components of a water-cooling tower at particular times or under particular conditions. For example, in cooling tower applications where the cooled water must be maintained within a relatively narrow temperature range, either changing weather conditions or changing parameters of operation of the equipment or process through which the cooled water is being circulated may require careful regulation of the operation of the cooling tower to maintain the cooled water within the desired temperature range. For such purpose, it is now common to employ air flow dampers of the moving vane or shutter type within the path of normal air flow in order to either reduce or cut off the normal flow of air through particular cooling components of the cooling tower as may be required for maintaining the desired evaporation rate or temperature of all of the water being cooled by the entire tower or tower complex. Such dampers, although most frequently disposed at the outlet side of the fill or cooled component portion of the air path, may also be employed at the air inlet side thereof. Other examples of conditions under which it may be desirable to throttle or block the flow of air through a cooling tower cell include situations in which excessive drafts produced by a hyperbolic tower during cold weather conditions causing excessive "pull in" of the gravitating water to be cooled toward the outlet side of the fill, and situations in which it may be desirable to throttle the operation of wet cooling components while maintaining full operation of dry cooling components in the same tower to minimize visible fog in the "plume" produced by fine particles of water in the air being discharged from the tower under certain weather conditions.

The use of dampers of the movable vane or mechanical shutter type has, however, proved far from satisfactory in water cooling towers, particularly because of the extreme environmental conditions in which such dampers must be disposed and operate. Aside from the high maintenance requirements for mechanically movable damper assemblies, it has been found that such devices are often unreliable in operation, particularly if they are to be operated automatically or by remote control. Moreover, the moving vane type of damper is especially susceptible to being rendered inoperable by icing conditions such as tend to occur in and around cooling towers during extreme weather conditions. Also, unless moving vane type dampers are to be operated and adjusted entirely manually, it is necessary to provide some sort of power means for operating them which itself will be subject to the high humidity and variable weather conditions of the cooling tower environment.

Accordingly, it is the principle object of this invention to provide a simpler, more reliable, less expensive and more versatile type of damper that will solve the wide variety of air flow control functions encountered in water cooling towers or the like and which will avoid the limitations and disadvantages inherent in the moving vane or mechanical shutter type dampers now available for such purpose.

It is another important object of the invention to provide such improved damper apparatus for controlling the flow of air or other gaseous medium in a water cooling tower or analogous device in which the principle mechanical parts are all stationary in nature with the control being accomplished merely through the selective introduction of quantities of a liquid medium such as water.

It is another important object of the invention to provide such improved damper apparatus which is ideally adapted for being controlled automatically merely by the employment of means for sensing some significant operating parameter of the system coupled with a valve for controlling the rate at which water or other liquid medium is introduced into the damper apparatus.

It is still another important object of the invention to provide such improved damper apparatus in which the trough-like structures utilized in achieving the damping function also serve the dual purpose of reducing or eliminating "drift" of particles of water into the air discharge when the damper apparatus is utilized at the outlet side of the water cooling zone in a water cooling tower.

Still other objects and advantages of the invention will be made clear or become apparent to those skilled in the art from the accompanying disclosure of a preferred embodiment of the invention.

Figure 2:
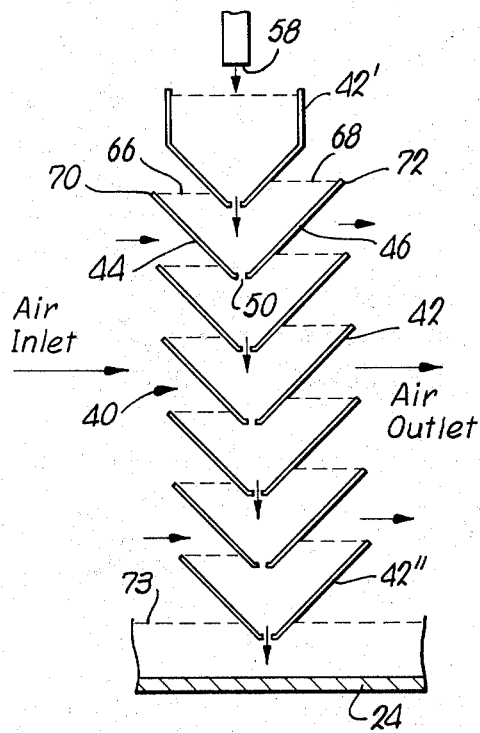
Figure 3:
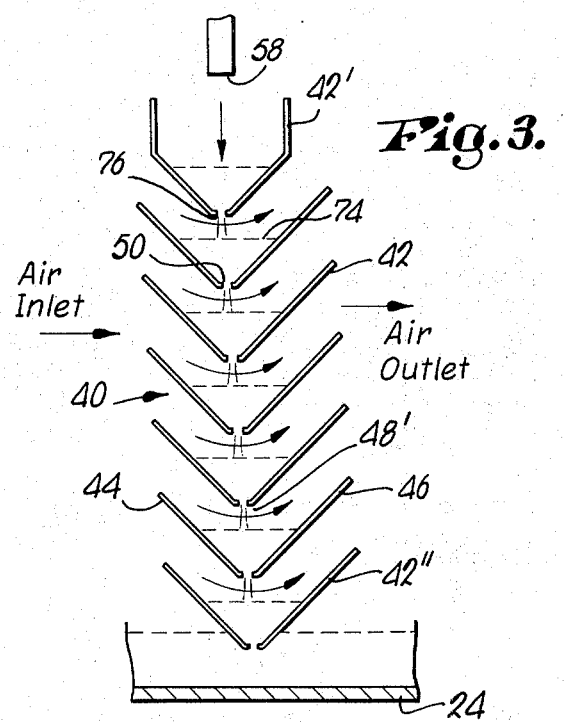

In the drawings:

FIG. 1 is a fragmentary, essentially schematic view of a portion of a conventional induced draft, cross-flow water cooling tower illustrating the employment of a preferred embodiment of the invention therein;

FIG. 2 is a schematic view showing a damper made in accordance with the preferred embodiment of the invention under conditions in which the rate of introduction of liquid into the damper has been set to maintain the level of liquid in each of the trough-like structures of the damper to completely block the flow of air through the damper; and FIG. 3 is a schematic view showing a damper made in accordance with the preferred embodiment of the invention under conditions in which the rate of introduction of liquid into the damper has been set to maintain the level of liquid in each of the trough-like structures of the damper to reduce the flow of air through the damper by partially restricting the cross-sectional area of the remaining passages for flow of air between the trough-like structures.

Figure 4:
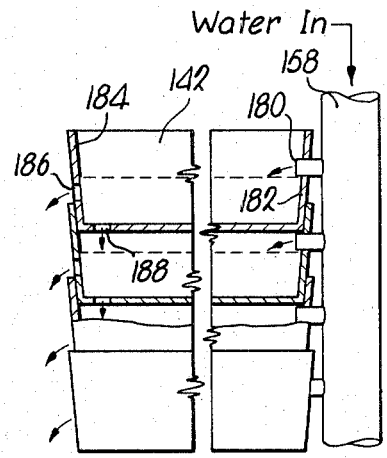

FIG. 4 is an enlarged, fragmentary, essentially cross-sectional schematic showing of another embodiment of the damper illustrating an end feed system for supplying liquid to the ends of the troughs and for effecting principally end draining thereof.

Referring now to the preferred embodiment of the invention, illustrated in FIGS. 1 to 3 inclusive of the drawing, as applied to a typical cross-flow water cooling tower, such tower is generally designated 10 and conventionally includes a housing 12, a conduit 14 for supplying water to be cooled to the tower 10, a valve 16 for controlling the amount of water to be cooled and to be introduced to the tower 10 or the particular cooling components thereof illustrated in FIG. 1, a water distribution pan 18 provided with a plurality of spray nozzles or openings 20 to permit water from the conduit 14 to gravitate into the cooling area 22 which will typically contain either a fill assembly or indirect cooling components (not shown), a water collection basin 24 below the cooling zone 22 for collecting water cooled during its gravitation through the latter and from which such cooled water will be supplied to and recirculated through the equipment or process being served and then returned through the conduit 14 for recooling, an inlet opening 26 from the atmosphere to one side of the cooling zone 22, a series of inlet louvers 28 disposed in the inlet opening 26 for purposes familiar to those skilled in the cooling tower art, a drift eliminator assembly 30 at the outlet side of the cooling zone 22, a discharge air collection zone 32 for receiving air after passage through the cooling zone 22 of the illustrated cooling components of the tower 10 and typically also from other such cooling components of the tower 10, an exhaust fan 34 and driving motor 36 therefor, and a discharge stack 38 defining an outlet for upward discharge of air from the zone 32 back into the atmosphere. It will be appreciated by those skilled in the art that the details and even the presence of certain of the structural elements 12-38 may vary in differing types of towers 10, but it is significant to note that essentially all water cooling towers 10 in common commercial usage include a normal path for the flow of air through the tower which includes at least some portion of such path through which the air normally flows in a generally horizontal direction, such portion of the path of normal air flow in the tower 10 chosen for illustration being from the atmosphere outside of the louvers 28, through the inlet opening 26, thence through the cooling zone 22, thence through an upright flow control zone hereinafter to be identified, thence through the drift eliminator assembly 30 and into the discharge air receiving zone 32.

Turning attention to the preferred embodiment of the invention and its illustrative employment in the tower 10, a generally upright zone extending generally transversely to the above-mentioned portion of the normal air flow path is generally designated 40 and has been disposed between the outlet side of the cooling zone 22 and the discharge air receiving zone 32 (or the drift eliminator assembly 30, if the latter is provided as hereinafter discussed). Within the control zone 40, a plurality of trough-like assemblies 42 are suitably mounted in any suitable fashion in a series spaced one above the other. Each structure includes what may be called an inlet side wall 44 and an outlet side wall 46 which are arranged to give each structure 42 a generally V-shaped cross-section. Triangular end walls 43 are provided at opposite end extremities of each structure 42. As will be apparent from the drawing, the structures 42 divide the above-mentioned path of normal air flow into a plurality of sub-paths between the structures 42, one of which sub-paths is indicated by the reference numeral 48. It will further be perceived, however, that the presence of the structures 42 in the control zone 40 does not block or substantially restrict the overall cross-sectional area of the normal air flow path through the zone 40, but rather merely subdivides it into the sub-paths 48 for purposes later to be described.

Even when the structures 42 are merely permitting normal flow of air from the cooling zone 22 toward the discharge receiving zone 32, however, an incidental though important advantage accrues from the structure of the invention, in that, the sinuous nature of the sub-paths 48 between the structures 42 has been found to produce very substantial drift elimination effects from the presence of the structures 42 themselves, by virtue of the tendency of small particles of water entrained in the air emanating from the cooling zone 22 to gather on the walls 44 and 46 of the structure 42.

Each of the structures 42 is provided with a number of water outlet holes 50 or alternately, openings at both or either end of each tray which, in the fully controllable preferred embodiment, are disposed adjacent the lower extremity of the structures 42, although those skilled in the art will appreciate from what follows that it would be quite feasible to dispose the openings 50 part way up one of the walls 44 or 46, or the end walls of each structure 42 in an application where it might be desired to preserve at least some minimum liquid level within the structures 42 for reasons peculiar to some particular application of the invention. The aggregate area of the holes 50 in each structure 42 in the preferred embodiment is sufficient to permit immediate draining to the structure 42 therebelow of water from drift particles incidentally gathered by the walls 44 and 46 but is chosen to be small enough for each structure 42 to retain sufficient water therein to maintain water levels within the desired range of variation needed for control purposes, all in the light of the range of rates at which water may be introduced for flow control purposes into the uppermost structure 42' as hereinafter described.

The source of liquid to be used for control purposes is carried by conduit 52 which, if water is to be used as would be normal in an application of the invention to a water cooling tower, may be simply tapped into the main hot water supply conduit 14 as at 54. If desired, however, the control water conduit 52 may be coupled to a source of "make-up water," instead of to the hot water conduit 14, so that the damper of the invention may conveniently be used for adding any quantity of water required in the overall system to make up for water loss through entrainment in the discharged air, evaporization, bleed, drift, or leakage. A damper control valve 56 is interposed in the control water conduit 52 and is normally used just for controlling the operation of the damper apparatus when the control liquid is derived from tapping into the main hot water conduit 14, but which may be provided with a low flow rate setting to permit the addition of make-up water without operation of the damper apparatus by introducing make-up water to the damper when the conduit 52 is supplied from a make-up water source at a rate sufficiently low that such make-up water will immediately gravitate through the holes 50 of the successive structures 42 into the collection basin 24 without ever collecting to any significant level within the structures 42.

When the valve 56 is sufficiently open, control water will be discharged from the spout 58 into the uppermost structure 42' of the damper apparatus at a rate such that the water will collect and be supported at a desired level within each of the lower structures 42, thereby, as the level of water retained within a given structure 42 rises to a point more closely spaced to the lower extremity of the structure 42 thereabove than the fixed spacing between the walls 44 and 46 of such adjacent structures 42, narrowing and restricting the cross-section of the corresponding sub-path 48 to throttle the passage of air through the control zone 40. It may be noted that, since the rate of flow of water out of each structure 42 through the holes 50 thereof is partially dependent upon the depth or head of water accumulated therein, no difficulty is encountered in maintaining a controlled and variable level of water within the structures 42 merely by adjusting the rate at which control water is introduced into the uppermost structure 42. In passing, it is observed that the structures 42, although preferably and most simply constructed with V-shaped cross-sections need not necessarily be so configured; for reasons shortly to be mentioned, however, it is desirable or even essential when the range of control is to include full blocking of air flow, that the lower extremity of each structure 42 should depend to a level somewhat below the upper edge of at least the wall 46 of the structure 42 next therebelow. It is also preferable in most types of cooling towers 10 that the series of structures 42 be inclined at least a slight angle from vertical superposition in order to allow for the natural "pull-in" of gravitating water in the cooling zone 22, as well as the similarly canted configuration commonly employed in fill assemblies or refrigerated component arrangements used in the cooling zone 22.

The double functionality of the structures 42 with respect to also performing a drift elimination function has already been noted. However, it has been further found that during throttling of air flow by operation of the damper apparatus with a body of water accumulated and supported in each structure 42, the drift elimination function of the apparatus of the invention is still further enhanced by the tendency of particles of drift water to be gathered into the water supported within the structures 42 upon contact with the upper surface thereof. Indeed, it appears both that the conventional drift eliminator assembly 30 can safely be eliminated altogether in many climatic environments because of the mentioned drift elimination action of the damper apparatus of this invention, and that it may even be desirable in some environments to maintain some minimum level of water within the structures 42 for drift elimination purposes even when no substantial degree of air flow reduction is needed. In such last mentioned instances, the level of water within the structures 42 would, of course, be maintained sufficiently low so as not to substantially restrict the effective cross-section of the sub-paths 48.

The damper control valve 56 may, if desired, merely be controlled manually. However, since control of the entire operation of the damper apparatus is dependent upon the setting of the valve 56, it is both convenient and highly advantageous in many applications to control the setting of the valve 56 automatically. In the application of the invention to a water cooling tower, the operation of the damper apparatus will in most instances be correlated with the temperature of the cooled water being provided by the tower 10. Accordingly, a temperature sensor may be disposed either within the cooled water in the collection basin 24 or perhaps back at the point where water from the tower 10 is being reintroduced into the equipment or processes being served. A hydraulic control sensor 60 is schematically shown in FIG. 1 as being coupled by conventional electrical, pneumatic or hydraulic means 62 with a servo motor or the like 64 operably connected with the valve 56 for adjusting the setting of the latter, it being understood that the sensor 60 could be temperature sensitive as described or could constitute any other type of conventional sensor for detecting some other parameter of the system and rendering the operation of the valve 56 subject thereto.

In operation, when no reduction or blocking of the normal flow of air is desired, the valve 56 will typically be entirely closed so that no control water is being introduced into the structures 42, and any water gathered in the structures 42 from drift particles will be immediately flowing by gravity through the holes 50 of successively lower structures 42 into the water collection basin 24.

The condition of the damper apparatus of the invention during controlled blocking of all air flow through the zone 40 is illustrated in FIG. 2. In that mode of operation of the damper apparatus, control liquid is being introduced from the spout 58 into the uppermost structure 42' at a rate sufficient to maintain a level of retained liquid within each structure 42 that is high enough to completely close the sub-path 48 normally presented between each pair of adjacent structures 42. It will be noted that the level of water 66 at the air inlet side of each structure 42 is somewhat below the level of water 68 at the outlet side of each structure 42. This is due to the air pressure differential which exists between the cooling zone 22 and the discharge air collection zone 32 by virtue of the operation of the exhaust fan 34. A similar condition will exist in different types of towers from the action of hyperbolic tower structures, natural draft, inlet fans or the like as the case may be. Because of such effect, however, and as will be seen in FIG. 2, the upper edge 70 of the inlet side wall 44 may be somewhat lower than the upper edge 72 of the outlet side wall 46 of each structure 42, which tends to facilitate the relatively unrestricted flow of air through the sub-paths 48 during periods when the damper apparatus of the invention is in its standby condition. When the liquid damper apparatus is being used to block the zone 40, however, with accumulated levels of liquid in the various structures 42 as illustrated in FIG. 2, it will be noted that even the lowermost part of the normal air path is blocked by the extension of the lowermost structure 42" beneath the normal level 73 of water accumulated in the main water collection basin 24.

Referring next to FIG. 3, the condition of the damper apparatus of the invention is illustrated during operation to achieve a selected but incomplete degree of throttling of air flow through the control zone 40. In that mode of operation, the quantity of control liquid being introduced into the uppermost structure 42' is adjusted by manual or automatic setting of the valve 56 to provide for the accumulation and retention in each structure 42 of a body of control liquid having a level 74 spaced at a pre-determined distance below the lowermost extremity 76 of the structure 42 thereabove. In this condition of the apparatus a sub-path 48' still exists between each adjacent pair of structures 42, but the cross-sectional area of each of such sub-paths 48' is effectively reduced by the fact that the liquid level 74 in each structure 42 is closer to the lower extremity 76 of the structure 42 thereabove than the normal spacing between the walls 44 and 46 of adjacent structures 42. The level 74 of control liquid within each structure 42 may be manually or automatically adjusted upwardly to vary the amount of reduction of normal air flow being effected merely by appropriate adjustment of the control valve 56. Although the preferred embodiment of damper apparatus contemplated by the invention provides the versatility of virtually infinite adjustment of the restriction of air flow between essentially zero restriction and full blocking, it will be appreciated that less sophisticated embodiments still enjoying many of the primary benefits of the invention may be satisfactory in particular applications or under particular circumstances. For example, if a damper were needed merely to vary the degree of restriction of air flow between substantially zero restriction and one pre-determined level of restriction, it would be possible to control the level of liquid within the structures 42 merely by permitting the control liquid to fill to a level such that additional liquid would overflow the edges of the structures 42, in which case the rate and amount of supply of liquid to the damper apparatus would not require a close degree of control, and the holes 50 could be sized merely upon considerations of providing a sufficient avenue for drainage of control liquid from the structures 42 whenever the supply of further control liquid was cut off and it was desired to revert to a condition of minimum restriction of air flow.

It will thus be understood that this invention is ideally suited to overcome the disadvantages of prior mechanical shutter or moving vane damper devices and do so in a most simple, economical, straightforward and reliable way. It will also be noted that, since the level of control liquid 74 is essentially infinitely variable from a condition with no liquid accumulated in the structures 42 through varying spacings of the liquid levels 74 from the lower extremity 76 of the structures 42, even to heights such as represented by the levels 66 and 68 in FIG. 2 for complete closure of the passages 48, a much more sensitive control is provided than was attainable with conventional mechanical dampers, which is particularly important where control of the damper apparatus is to be exercised on an automatic basis responsive to an appropriate system parameter sensor 60.

Although previously indicated in a general way, it should perhaps be reiterated that the zone 40, the structures 42 and the other associated parts of the apparatus of the invention may be located anywhere within the normal path of air flow in the tower 10 at which a generally upright control zone 40 may substantially traverse the normal air flow path; thus, such control zone 40 could, if desirable or more convenient in a particular application, just as well be located at the inlet side of the cooling zone 22, rather than at the outlet side thereof as in the preferred embodiment. With the damper apparatus of the invention at the inlet side of the cooling zone 22, however, it is apparent that the desirable auxiliary action of the damper apparatus as a drift eliminator would not be enjoyed and that it would be necessary to provide for drift elimination by a conventional drift eliminator assembly 30 at the outlet side of the cooling zone 22. It should also be clear that the provision of similar but separate liquid damper apparatus, with associated control valves 56 and sensors 60, for each of a plurality of cooling components of a given cooling tower installation is contemplated and preferred, in order to attain the advantages of air flow throttling or blocking on an individual cell basis.

Disposition of the damper apparatus in the location thereof illustrated in FIG. 1 is advantageous though when used in a cooling tower application in that freeze up of the troughs is prevented during cold weather operation since hot humid air from fill 22 is directed against and through the damper system. In addition, the damper structure will serve as a drift droplet dilution device when it is supplied with fresh make-up water even though the primary water being cooled in the tower has a relatively high mineral content, since the damper acts as a combination drift eliminator and drift dilution scrubber where located adjacent the air exit face of the fill assembly. Any new drift beyond the damper inherently has less solids of concentration than the primary water stream in the cooling tower because of dilution thereof by the fresh make-up water supplied to the damper structure.

In the alternate embodiment of the invention shown in FIG. 4, the upright water supply pipe 158 has an outlet nozzle 180 for each trough 142 which extends through the adjacent end wall 182 of a respective trough. Similarly, opposed end walls 184 of each trough 142 has a drain opening 186 therein permitting water to drain from the corresponding trough 142 and gravitate into water collection basin 24 therebelow. Since openings 186 are necessarily located above the level of the end wall 184 of the trough next therebelow, each of the troughs 142 has one more opening 188 in the bottom apex thereof to drain residual water from each trough to the trough below. Since the majority of the water drains from each trough 142 through respective openings 186, the small amount of water which must drain through openings 188 does not significantly interfere with fast draining of the troughs. It is therefore manifest that the end-feed and drain system accelerates filling as well as draining of the troughs. More rapid control response time is thereby provided for certain system applications which have this specific requirement.

Finally, it should be observed that those skilled in the art may find other advantageous uses for the liquid damper apparatus of this invention in applications other than water cooling towers. Indeed, the invention would appear to have possible utility in essentially any application involving a path for flow of a gaseous medium in which a generally upright control zone may be interposed and in which it may be desirable to either restrict or block the flow of gaseous medium from one side of the control zone to the other side thereof, it being further noted that the damper apparatus of the invention essentially is bilateral in operation and adapted for restricting or blocking the flow of gaseous medium in either direction through the control zone in which the apparatus is disposed. It is also possible that in some such applications in analogous fields it might be advantageous to employ a control liquid other than water, and this is contemplated; for example, in an application involving very high pressure differentials across the control zone, it might be desirable to employ a liquid having a greater density than water.

We claim:

1. In a water cooling tower:

means including a hot water distribution basin, a cold water basin therebelow, and a fill assembly between the basins presenting a path for normal flow of air into, through and out of said tower, said path including a generally upright zone extending generally transversely to the course of normal air flow along said path;

means for causing air to move through and in interserting relationship to water gravitating from the hot water basin to the cold water basin through said fill assembly;

a plurality of spaced structures mounted adjacent the air exit face of said fill assembly in disposition to receive hot moist air therefrom and juxtaposed one above another within said zone and dividing the portion of said path through said zone into a plurality of sub-paths between said structures, at least certain of said structures including means for receiving and supporting bodies of water in disposition relative to the next higher structure for at least partially blocking the corresponding sub-path; and means for supplying controlled quantities of water to said certain structures for at least partially restricting air flow along said path when such restriction is desired.

2. The invention of claim 1, wherein said supplying means is operable for introducing water into an uppermost of said structures, and each of said structures is provided with means for passing water to a certain structure therebelow.

3. The invention of claim 1, wherein said certain structures are operable for supporting bodies of water attaining levels at which said bodies contact the structure next thereabove for fully blocking the corresponding sub-path when desired.

4. The invention of claim 1, wherein is provided means for sensing an operating parameter of said tower operably coupled with said supplying means for automatically controlling the amount of water supplied to said certain structures.

5. The invention of claim 1, wherein said certain structures comprise superposed assemblies having a lowermost portion provided with holes therein for flow of water to the certain structure next therebelow.

6. The invention of claim 1, wherein said certain structures include side walls having upper edges presenting an open top and a lowermost portion depending below the level of the upper edge of a side wall of the certain structure next therebelow.

7. The invention of claim 1, wherein said certain structures comprise superposed trough-like assemblies of generally, V-shaped transverse cross-section having inclined upwardly diverging side walls, said sub-paths being between corresponding side walls of adjacent assemblies and extending first at a downward incline then at an upward incline around the lower extremity of the upper of said adjacent assemblies.

8. The invention of claim 7, wherien said lower extremity of the upper of said adjacent assemblies depends below the level of the upper extremity of at least one of said side walls of the lower of said adjacent assemblies.

9. The invention of claim 8, wherein said assemblies are provided with holes adjacent said lower extremity thereof for flow of water therefrom into the adjacent assembly next therebelow.

10. The invention of claim 9, said water supplying means includes a valve for selectively controlling the rate at which water is introduced into the uppermost of said assemblies.

11. The invention of claim 10, wherein is provided means for sensing the temperature of water cooled by said tower operably coupled with said valve for automatically controlling said valve.

* * * * *